(12) United States Patent
Takahashi et al.

(10) Patent No.: US 11,046,386 B2
(45) Date of Patent: Jun. 29, 2021

(54) CONTROL DEVICE AND BRAKE SYSTEM

(71) Applicant: Shimano Inc., Osaka (JP)

(72) Inventors: Toshihiko Takahashi, Osaka (JP);
Masahiro Nakakura, Osaka (JP);
Masahiro Fukuda, Osaka (JP)

(73) Assignee: Shimano Inc., Osaka (JP)

( * ) Notice: Subject to any disclaimer, the term of this patent is extended or adjusted under 35 U.S.C. 154(b) by 170 days.

(21) Appl. No.: 16/174,865

(22) Filed: Oct. 30, 2018

(65) Prior Publication Data

US 2019/0127017 A1 May 2, 2019

(30) Foreign Application Priority Data

Oct. 31, 2017 (JP) .............................. JP2017-211269

(51) Int. Cl.
| | | |
|---|---|---|
| *B62L 1/02* | (2006.01) | |
| *B62L 3/02* | (2006.01) | |
| *B62J 99/00* | (2020.01) | |
| *B60T 8/17* | (2006.01) | |
| *B62J 45/20* | (2020.01) | |
| *B62J 45/40* | (2020.01) | |
| *B62M 6/55* | (2010.01) | |

(52) U.S. Cl.
CPC ..................... *B62L 1/02* (2013.01);
*B60T 8/17* (2013.01); *B60T 8/1706* (2013.01);
*B62J 99/00* (2013.01); *B62L 3/02* (2013.01);
*B62J 45/20* (2020.02); *B62J 45/40* (2020.02);
*B62M 6/55* (2013.01)

(58) Field of Classification Search
CPC ..... B62L 1/02; B62L 3/02; B60T 8/17; B60T 8/1706; B60T 13/74; B62J 99/00; B62J 45/20; B62J 45/40; B62M 6/55
See application file for complete search history.

(56) References Cited

U.S. PATENT DOCUMENTS

| | | | |
|---|---|---|---|
| 2007/0278055 A1* | 12/2007 | Chen ........................ | B62L 1/00 188/2 D |
| 2008/0236269 A1* | 10/2008 | Howell ................. | B60T 17/221 73/121 |
| 2010/0030490 A1 | 2/2010 | Wright et al. | |
| 2014/0229054 A1* | 8/2014 | Gerundt ................... | B62M 6/50 701/29.4 |
| 2016/0137174 A1 | 5/2016 | Valenzano | |
| 2016/0318575 A1* | 11/2016 | Shimoda ................. | B62J 27/00 |

(Continued)

FOREIGN PATENT DOCUMENTS

| | | |
|---|---|---|
| DE | 10 2008 019 469 A1 | 10/2009 |
| DE | 10 2015 201 932 A1 | 8/2016 |

(Continued)

OTHER PUBLICATIONS

Machine Translation WO 2011/010865 (Year: 2011).*

*Primary Examiner* — Anne Marie Antonucci
(74) *Attorney, Agent, or Firm* — Global IP Counselors, LLP

(57) ABSTRACT

A control device is provided for controlling for a brake system of a human-powered vehicle that includes a rotary body and a brake device that brakes the rotary body. The control device of the brake system includes an acquisition portion acquiring information related to at least one of the rotary body and the brake device to appropriately brake the rotary body with the brake device.

21 Claims, 6 Drawing Sheets

(56) References Cited

U.S. PATENT DOCUMENTS

2018/0362004 A1    12/2018  Atsushi et al.
2018/0370593 A1*   12/2018  Park ..................... B62K 25/04

FOREIGN PATENT DOCUMENTS

| DE | 10 2015 207 256 A1 | 10/2016 | |
|---|---|---|---|
| JP | 2010-32054 A | 2/2010 | |
| JP | 2017-30395 A | 2/2017 | |
| JP | 2017-112801 A | 6/2017 | |
| WO | WO-2011010865 A2 * | 1/2011 | ................ B60T 7/02 |

* cited by examiner

CONTROL DEVICE AND BRAKE SYSTEM

CROSS-REFERENCE TO RELATED APPLICATIONS

This application claims priority to Japanese Patent Application No. 2017-211269, filed on Oct. 31, 2017. The entire disclosure of Japanese Patent Application No. 2017-211269 is hereby incorporated herein by reference.

BACKGROUND

Field of the Invention

The present invention generally relates to a control device and a brake system comprising a control device.

Background Information

Japanese Laid-Open Patent Publication No. 2017-30395 (Patent document 1) describes an example of a brake system applied to a human-powered vehicle. The brake system comprises a rotary body and a brake device braking the rotary body

SUMMARY

It is desirable to brake a rotary body by a brake device appropriately.

A control device according to a first aspect of the present disclosure is provided for a brake system of a human-powered vehicle. The brake system includes a rotary body and a brake device that applies a braking force to the rotary body. The control device includes an acquisition portion. The acquisition portion includes at least one of a sensor or a communicator that acquires information related to at least one of the rotary body and the brake device. According to the control device of the first aspect, the brake device is driven based on information acquired by the acquisition portion. Thus, it is possible to appropriately brake the rotary body with the brake device.

In accordance with a second aspect of the present disclosure, the control device according to the first aspect is configured so that the acquisition portion is configured to acquire first information related to the rotary body. According to the control device of the second aspect, it is possible to appropriately brake the rotary body based on the first information.

In accordance with a third aspect of the present disclosure, the control device according to the second aspect is configured so that the acquisition portion includes a temperature sensor as the sensor that is configured to acquire information related to a temperature of the rotary body as the first information. According to the control device of the third aspect, it is possible to appropriately brake the rotary body based on the temperature of the rotary body.

In accordance with a fourth aspect of the present disclosure, the control device according to the second or third aspect is configured so that the acquisition portion includes a rotation sensor as the sensor that is configured to acquire information related to a number of rotations of the rotary body as the first information. According to the control device of the fourth aspect, it is possible to appropriately brake the rotary body based on the number of rotations of the rotary body.

In accordance with a fifth aspect of the present disclosure, the control device according to any one of the second to fourth aspects is configured so that the acquisition portion includes the communicator that is configured to acquire information related to manufacturing of the rotary body as the first information. According to the control device of the fifth aspect, it is possible to appropriately brake the rotary body based on the information related to manufacturing of the rotary body.

In accordance with a sixth aspect of the present disclosure, the control device according to any one of the first to fifth aspects is configured so that the acquisition portion is configured to acquire second information related to the brake device. According to the control device of the sixth aspect, it is possible to appropriately brake the rotary body based on the second information.

In accordance with a seventh aspect of the present disclosure, the control device according to the sixth aspect is configured so that the acquisition portion includes the sensor that is configured to acquire information related to a friction member contacting the rotary body. According to the control device of the seventh aspect, it is possible to appropriately brake the rotary body based on the information related to the friction member the second information.

In accordance with an eighth aspect of the present disclosure, the control device according to the seventh aspect is configured so that the sensor includes a thickness sensor that is configured to acquire information related to a remaining amount of the friction member as the second information. According to the control device of the eighth aspect, it is possible to appropriately brake the rotary body based on the information related to the remaining amount of the friction member.

In accordance with a ninth aspect of the present disclosure, the control device according to the seventh or eighth aspect is configured so that the sensor includes a temperature sensor that is configured to acquire information related to a temperature of the friction member as the second information. According to the control device of the ninth aspect, it is possible to appropriately brake the rotary body based on the temperature of the friction member.

In accordance with a tenth aspect of the present disclosure, the control device according to any one of the sixth to ninth aspects is configured so that the at least one of the sensor and the communicator is configured to acquire information related to an operating portion operated by a user as the second information. According to the control device of the tenth aspect, it is possible to appropriately brake the rotary body based on the information related to the operating portion.

In accordance with an eleventh aspect of the present disclosure, the control device according to the tenth aspect is configured so that the at least one of the sensor and the communicator is configured to acquire information related to input and output of the operating portion as the second information.

According to the control device of the eleventh aspect, it is possible to appropriately brake the rotary body based on the information related to input and output of the operating portion.

In accordance with a twelfth aspect of the present disclosure, the control device according to any one of the sixth to eleventh aspects is configured so that the acquisition portion includes the communicator that is configured to acquire information related to manufacturing of the brake device as the second information. According to the control device of the twelfth aspect, it is possible to appropriately brake the rotary body based on the information related to manufacturing of the brake device.

In accordance with a thirteenth aspect of the present disclosure, the control device according to any one of the first to twelfth aspects further comprises an electronic controller that is operatively connected to the brake device which includes a braking portion that is configured to apply a braking force to the rotary body and an electric driver that is configured to drive the braking portion in response to an output signal from the electronic controller. According to the control device of the thirteenth aspect, the electric driver is appropriately controlled based on information acquired by the acquisition portion.

In accordance with a fourteenth aspect of the present disclosure, the control device according to the thirteenth aspect is configured so that the acquisition portion is operatively connected to the electronic controller to communicate with the controller, and the electronic controller is configured to control the electric driver based on information from the acquisition portion. According to the control device of the fourteenth aspect, the information acquired by the acquisition portion easily reflects in the control of the electric driver performed by the controller.

In accordance with a fifteenth aspect of the present disclosure, the control device according to any one of the first to fourteenth aspects further includes a notification portion that is operatively connected to the acquisition portion and that is configured to be activated based on information from the acquisition portion. According to the control device of the fifteenth aspect, the user is notified of the information acquired by the acquisition portion.

A sixteenth aspect of the present disclosure is a brake system comprising the control device according to any one of the first to fifteenth aspects and further comprises the brake device. The brake device is controlled based on information acquired by the acquisition portion. Thus, it is possible to appropriately brake the rotary body with the brake device.

In accordance with a seventeenth aspect of the present disclosure, the brake system according to the sixteenth aspect is configured so that the control device is provided at the brake device. According to the brake system of the seventeenth aspect, the configuration of the brake system is simplified.

In accordance with an eighteenth aspect of the present disclosure, the brake system according to the sixteenth or seventeenth aspect further comprises the rotary body. According to the brake system of the eighteenth aspect, the brake device is controlled based on information acquired by the acquisition portion.

In accordance with a nineteenth aspect of the present disclosure, the brake system according to any one of the sixteenth to eighteenth aspects further includes a power supply electrically connected to the brake device. According to the brake system of the nineteenth aspect, the brake device is electrically controlled.

In accordance with a twentieth aspect of the present disclosure, the brake system according to the nineteenth aspect is configured so that the power supply includes an electric power generator. According to the brake system of the twentieth aspect, electric power for driving the brake device is supplied within the system. Thus, the configuration of the brake system is simplified.

In accordance with a twenty-first aspect of the present disclosure, the brake system according to the nineteenth or twentieth aspect is configured so that the power supply includes a storage battery. According to the brake system of the twenty-first aspect, electric power is supplied to the brake device as necessary.

The control device and the brake system according to the present disclosure appropriately brake the rotary body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiment

Figure 1:
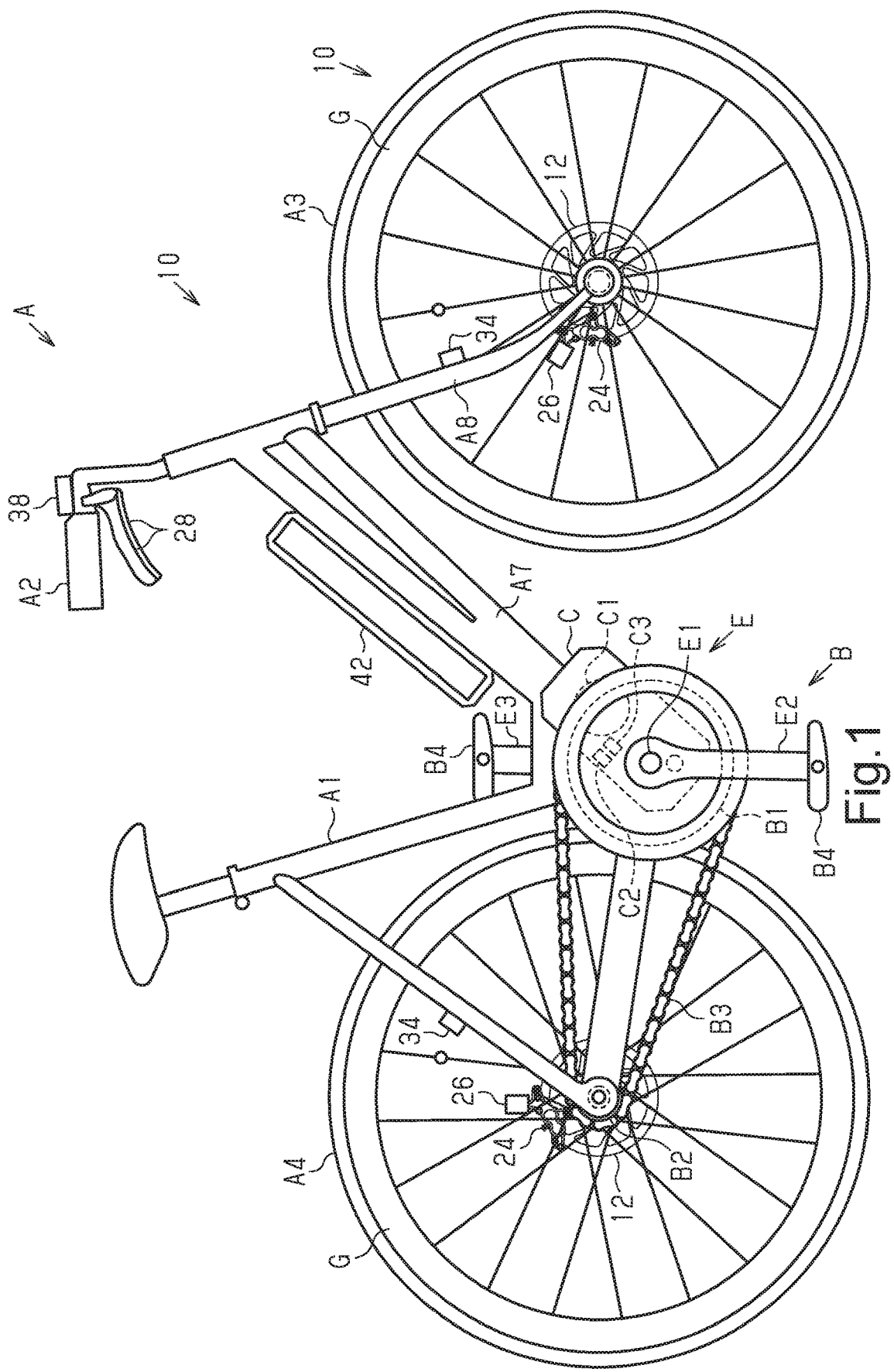
FIG. 1 is a side elevational view of a human-powered vehicle that is equipped with a brake system in accordance with one embodiment.

A human-powered vehicle A that includes a brake system 10 will now be described with reference to FIG. 1. The human-powered vehicle A refers to a vehicle that at least partially uses human power as a driving force for propulsion and includes a vehicle that assists human power with an electric motor. Human-powered vehicles do not include vehicles that use only driving forces other than human power. In particular, human-powered vehicles do not include vehicles that solely use internal combustion engines for driving force. A typical human-powered vehicle is a small and light vehicle that does not require a license for driving on a public road. The illustrated human-powered vehicle A is a bicycle (e-bike) including an assist device C that uses electric energy to assist propulsion of the human-powered vehicle A. More specifically, the illustrated human-powered vehicle A is a city bicycle. The configuration of the human-powered vehicle A can be changed in any manner. The human-powered vehicle A can be configured without the assist device C. In other words, the human-powered vehicle A can be a typical bicycle that is driven by only human driving force. The type of the human-powered vehicle A can be a road bike, a mountain bike, or a cross bike. The human-powered vehicle A comprises a main body A1, a handlebar A2, a front wheel A3, a rear wheel A4, a drive mechanism B, the assist device C, and the brake system 10. The main body A1 comprises a frame A7.

The drive mechanism B transfers human driving force to the rear wheel A4. The drive mechanism B is of a chain-drive type and includes a front sprocket B1, a rear sprocket B2, a chain B3, a crank mechanism E, and a pair of pedals B4. The drive mechanism B can be of any type such as a belt-drive type or a shaft-drive type.

The crank mechanism E includes a crankshaft E1, a right crank E2, and a left crank E3. The crank E1 is rotatably supported by a bottom bracket provided on the frame A7. The right crank E2 and the left crank E3 are each coupled to the crankshaft E1. One of the pedals B4 is rotatably supported by the right crank E2. The other of the pedals B4 is rotatably supported by the left crank E3.

The front sprocket B1 is coupled to the crankshaft E1. The crankshaft E1 and the front sprocket B1 are coaxial. Any structure can be used to couple the crankshaft E1 and the front sprocket B1. A one-way clutch is provided between the crankshaft E1 and the front sprocket B1. The one-way clutch transfers rotation of the crankshaft E1 to the front sprocket B1 in a case in which the rotational speed of the crankshaft E1, which is rotated forward, is higher than the rotational speed of the front sprocket B1. The front sprocket B1 and the crankshaft E1 can be coupled so as to be relatively non-rotatable.

The rear sprocket B2 is rotatably supported by the rear wheel A4. The chain B3 is wound around the front sprocket B1 and the rear sprocket B2. In a case in which the human driving force applied to the pedals B4 rotates the crankshaft E1 and the front sprocket B1 forward, the human driving force transferred via the chain B3 and the rear sprocket B2 rotates the rear wheel A4 forward.

The assist device C includes an assist motor C1, a drive circuit C2, a reduction gear C3, and a one-way clutch (not shown). The assist device C transfers torque to the front sprocket B1 to assist propulsion of the human-powered vehicle A.

Figure 2:
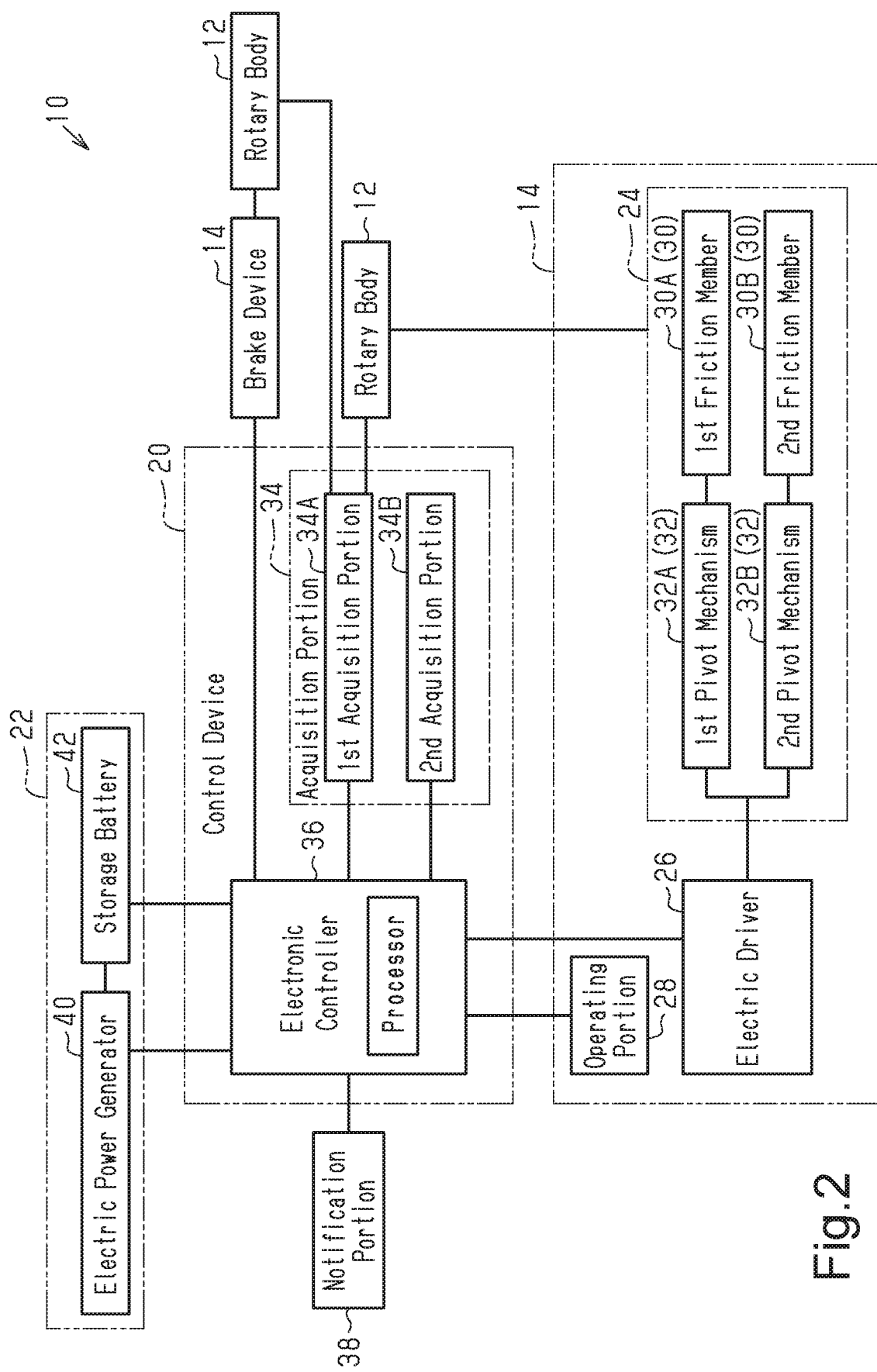
FIG. 2 is a block diagram of the brake system shown in FIG. 1.
Figure 3:
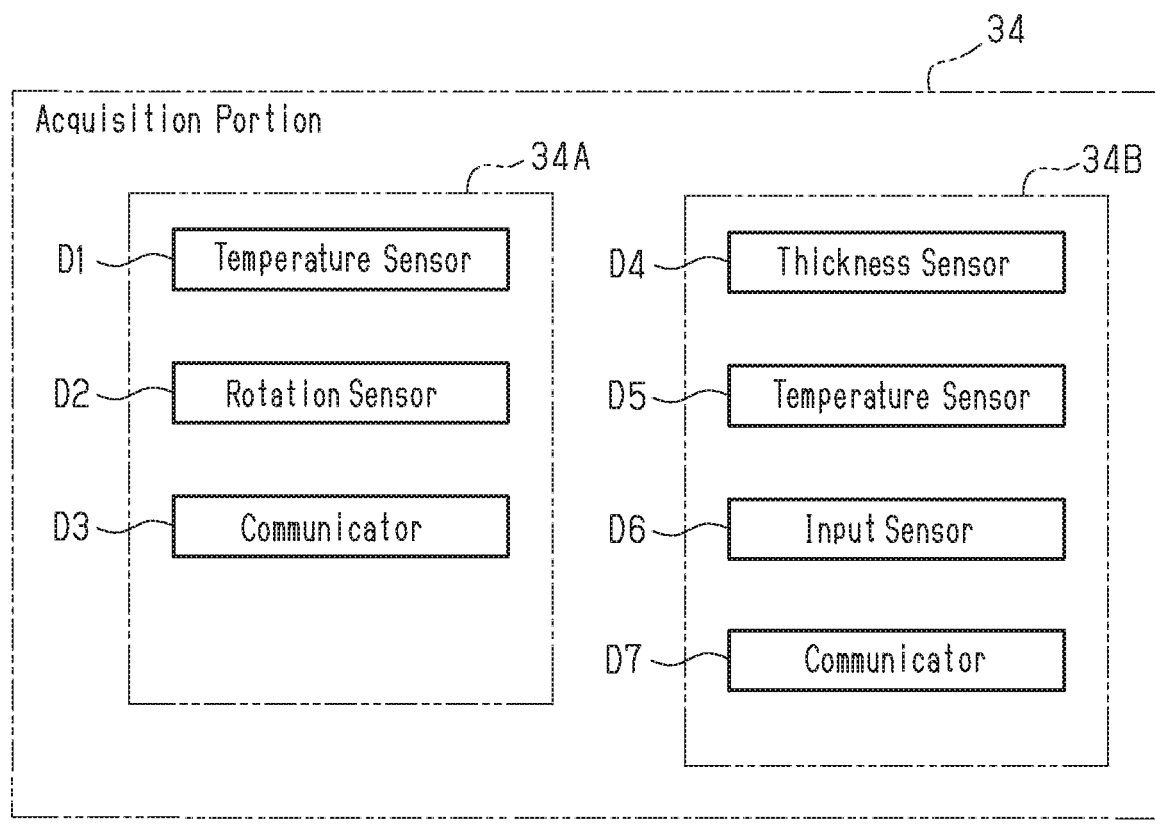
FIG. 3 is a block diagram of an acquisition portion of the brake system shown in FIG. 2.

The brake system 10 shown in FIG. 2 comprises a pair of rotary bodies 12, a pair of brake devices 14, and a control device 20. Preferably, the brake system 10 further comprises a power supply 22. In this embodiment, two of the rotary bodies 12 are included in the brake system 10. One of the rotary bodies 12 is a disc brake rotor (refer to FIG. 1) provided at the front wheel A3 of the human-powered vehicle A and rotates together with the front wheel A3. The other of the rotary bodies 12 is a disc brake rotor (refer to FIG. 1) provided at the rear wheel A4 and rotates together with the rear wheel A4. In this embodiment, two of the brake devices 14 are included in the brake system 10. One of the brake devices 14 brakes the rotary body 12 provided at the front wheel A3. The other of the brake devices 14 brakes the rotary body 12 provided at the rear wheel A4. More specifically, the one of the brake device 14 includes a braking portion 24 braking the rotary body 12 provided at the front wheel A3 and an electric driver 26 driving the braking portion 24. The other of the brake devices 14 includes a braking portion 24 braking the rotary body 12 provided at the rear wheel A4 and an electric driver 26 driving the braking portion 24. In this embodiment, the braking portions 24 are disc brake calipers braking the rotary bodies 12, which are disc brake rotors. The rotary bodies, which are the braking subjects, can be rims G (refer to FIG. 1) of the front wheel A3 and the rear wheel A4. In this case, the braking portions 24 are rim brake calipers.

Each of the braking portions 24 comprises a friction member 30 and a pivot mechanism 32. The friction member 30 comprises a first friction member 30A and a second friction member 30B. The first friction member 30A and the second friction member 30B are, for example, disc brake pads. The first friction member 30A is arranged to face one surface of the rotary body 12. The first friction member 30A brakes the rotary body 12 by being pushed by a first pivot mechanism 32A against the one surface of the rotary body 12. The second friction member 30B is arranged to face the other surface of the rotary body 12. The second friction member 30B is arranged to face the first friction member 30A via the rotary body 12. The second friction member 30B brakes the rotary body 12 by being pushed by a second pivot mechanism 32B against the other surface of the rotary body 12. The first pivot mechanism 32A moves the first friction member 30A toward and away from the rotary body 12. The second pivot mechanism 32B moves the second friction member 30B toward and away from the rotary body 12. The electric drivers 26 are configured to drive the braking portions 24. The electric drivers 26 are, for example, electric motors. The electric drivers 26 are driven by electric power supplied from the power supply 22.

Each of the brake device 14 further includes an operating portion 28. The operating portion 28 is, for example, an operating device including a lever. The operating portion 28 is connected to communicate with an electronic controller 36 (described later) of the control device 20 so that a signal is sent to the electronic controller 36 in accordance with operation. The term "electronic controller" as used herein refers to hardware that executes a software program. The electronic controller 36 will hereafter be referred to simply as the controller 36. The operating portion 28 is connected by an electric wire allowing for power line communication (PLC) or a communication line to communicate with the controller 36. Alternatively, the operating portion 28 can be connected to communicate with the controller 36 by a wireless communication device that allows for wireless communication. In a case where the operating portion 28 is operated, a signal for braking at least one of the front wheel A3 and the rear wheel A4 is sent to the controller 36, and the electric driver 26 is operated in accordance with the signal. In this embodiment, the two brake devices 14 are each provided with the operating portion 28. The operating portion 28 can be shared by the two brake devices 14.

The control device 20 comprises an acquisition portion 34, which can also be referred to as an acquisition device. The control device 20 further comprises the controller 36 and a notification portion 38. The acquisition portion 34 is configured to acquire information related to at least one of the rotary bodies 12 and the brake devices 14. The acquisition portion 34 is connected to communicate with the controller 36 by a wire or wireless communication. The acquisition portion 34 is configured to acquire first information related to the rotary bodies 12. Thus, the rotary bodies 12 are appropriately braked based on the first information. The acquisition portion 34 is configured to acquire second information related to the brake devices 14. Thus, the rotary bodies 12 are appropriately braked based on the second information. The acquisition portion 34 comprises a first acquisition portion 34A, which can also be referred to as a first acquisition device, and a second acquisition portion 34B, which can also be referred to as a second acquisition device. In this embodiment, the control device 20 is configured so that the two of the brake devices 14 (two of the braking portions 24 and two of the electric drivers 26) are controlled by a single controller (the controller 36). Alternatively, two respective control devices can be provided corresponding to the two brake devices 14.

The first acquisition portion 34A acquires the first information. The first information includes information related to the temperature of the rotary bodies 12. Thus, the rotary bodies 12 are appropriately braked based on the temperature of the rotary bodies 12. The first information includes information related to the number of rotations of the rotary bodies 12. Thus, the rotary bodies 12 are appropriately braked based on the number of rotations of the rotary bodies 12. The first information includes information related to manufacturing of the rotary bodies 12. Thus, the rotary bodies 12 are appropriately braked based on the information related to manufacturing of the rotary bodies 12. The first acquisition portion 34A sends the acquired first information to the controller 36. The first acquisition portion 34A includes a temperature sensor D1, a rotation sensor D2, and a communicator D3. The temperature sensor D1 detects the temperature of the rotary bodies 12. The temperature sensor D1 is attached to the rotary bodies 12. The rotation sensor D2 detects the number of rotations of the rotary bodies 12 and the rotational speed of the rotary bodies 12. The rotation sensor D2 is attached to, for example, a front fork A8 of the frame A7 (refer to FIG. 1). The rotation sensor D2 sends a signal corresponding to change in the relative position of a magnet attached to the rotary body 12 and the rotation sensor D2 to the controller 36. The communicator D3 is configured to communicate with an external terminal carried by the user and obtains information related to manufacturing of the rotary bodies 12 that is input by the user from the external terminal. The information related to manufacturing of the rotary bodies 12 includes, for example, the manufacturer of the rotary bodies 12, the year, month, and day on which the rotary bodies 12 were manufactured, and the material of the rotary bodies 12.

The second acquisition portion 34B acquires the second information. The second information includes information related to the friction members 30 contacting the rotary bodies 12. Thus, the rotary bodies 12 are appropriately braked based on the information related to the friction members 30. The second information includes information related to the remaining amount of the friction members 30. Thus, the rotary bodies 12 are appropriately braked based on the information related to the remaining amount of the friction members 30. The second information includes information related to the temperature of the friction members 30. Thus, the rotary bodies 12 are appropriately braked based on the information related to the temperature of the friction members 30. The second information includes information related to the operating portions 28 operated by the user. Thus, the rotary bodies 12 are appropriately braked based on the information related to the operating portions 28. The second information includes information related to input and output of the operating portions 28. Thus, the rotary bodies 12 are appropriately braked based on the information related to input and output of the operating portions 28. The second information includes information related to manufacturing of the brake devices 14. Thus, the rotary bodies 12 are appropriately braked based on the information related to manufacturing of the brake devices 14. The second acquisition portion 34B includes a thickness sensor D4, a temperature sensor D5, an input sensor D6, and a communicator D7. The thickness sensor is, for example, a laser displacement sensor configured to measure the thickness of the friction members 30 without contact. The thickness sensor D4 sends the information related to the remaining amount of the first friction member 30A and the second friction member 30B based on the thickness of the first friction member 30A and the second friction member 30B to the controller 36. The temperature sensor D5 detects the temperature of the friction members 30. The temperature sensor D5 is attached to the friction members 30. The input sensor D6 detects an input mode of the operating portions 28. The input mode of the operating portions 28 is, for example, the rotation amount of the operating portions 28 and pressing force to the operating portions 28. The input sensor D6 is attached to the operating portions 28. The communicator D7 is configured to communicate with the operating portions 28 and an external terminal carried by the user. The communicator D7 obtains the information related to input and output of the operating portions 28 and the information related to manufacturing of the brake devices 14. The information related to manufacturing of the brake devices 14 includes, for example, the manufacture of each component of the brake devices 14, the year, month, and day on which each component of the brake devices 14 was manufactured, and the material of the brake devices 14. Such information related to manufacturing is stored in advance in each component of the brake devices 14, such as the braking portions 24, the electric drivers 26, and the operating portions 28, and is retrieved from each component via the communicator D7. The information related to manufacturing can be input by the user from the external terminal via a connector.

The power supply 22 comprises an electric power generator 40 and a storage battery 42. Thus, an external power supply driving the brake devices 14 is not needed, and the configuration of the brake system 10 is simplified. The electric power generator 40 generates electric power by rotating together with the rotary bodies 12. The electric power generator 40 is, for example, a dynamo. The electric power generator 40 supplies electric power to the electric drivers 26 and the storage battery 42. The storage battery 42 stores electric power generated by the electric power generator 40. Thus, electric power is supplied to the brake devices 14 as necessary. The storage battery 42 is, for example, a lead-acid battery, a nickel-metal hydride battery, or a lithium-ion battery. The storage battery 42 is provided at the frame A7 (refer to FIG. 1). The storage battery 42 is provided to supply electric power to the assist motor C1 of the assist device C and other electric devices.

The controller 36 controls the electric drivers 26 based on information from the acquisition portion 34. The controller 36 includes is a central processing unit (CPU) or a micro processing unit (MPU) that one or more processors and a storage including a semiconductor memory and a hard disk drive. The controller 36 is preferably provided at one of the braking portions 24. Alternatively, as mentioned above, the brake system 10 can have a pair of separate control devices that each have the configuration of the control device 20 as seen in FIG. 2 such that one of the controllers is preferably provided at each of the braking portions 24. Thus, the configuration of the brake system 10 is simplified. The controller 36 controls the electric drivers 26 so that the braking portions 24 apply specified braking force to the rotary bodies 12 based on the first information and the second information obtained by the acquisition portion 34. The controller 36 controls the electric drivers 26 so that as the temperature of the rotary bodies 12 increases, pressing force of the friction members 30 against the rotary bodies 12 increases. The controller 36 controls the electric drivers 26 so that as the number of rotations of the rotary bodies 12 increases, pressing force of the friction members 30 against the rotary bodies 12 increases. The controller 36 controls the electric drivers 26 so that as the thickness of the friction members 30 is reduced, that is, as the remaining amount of the friction members 30 is reduced, pressing force of the friction members 30 against the rotary bodies 12 increases. The controller 36 controls the electric drivers 26 so that as the temperature of the friction members 30 increases, pressing force of the friction members 30 against the rotary bodies 12 increases. The controller 36 of the control device 20 performs an operation of the brake system 10 based on information from the acquisition portion 34, for example, as described below.

The notification portion 38 notifies the user of the state of the brake system 10 based on a signal from the controller 36 using at least one of sound, light, and vibration. Thus, the user is notified of the information acquired by the acquisition portion 34. The notification portion 38 is installed, for example, on the handlebar A2 (refer to FIG. 1).

Figure 4:
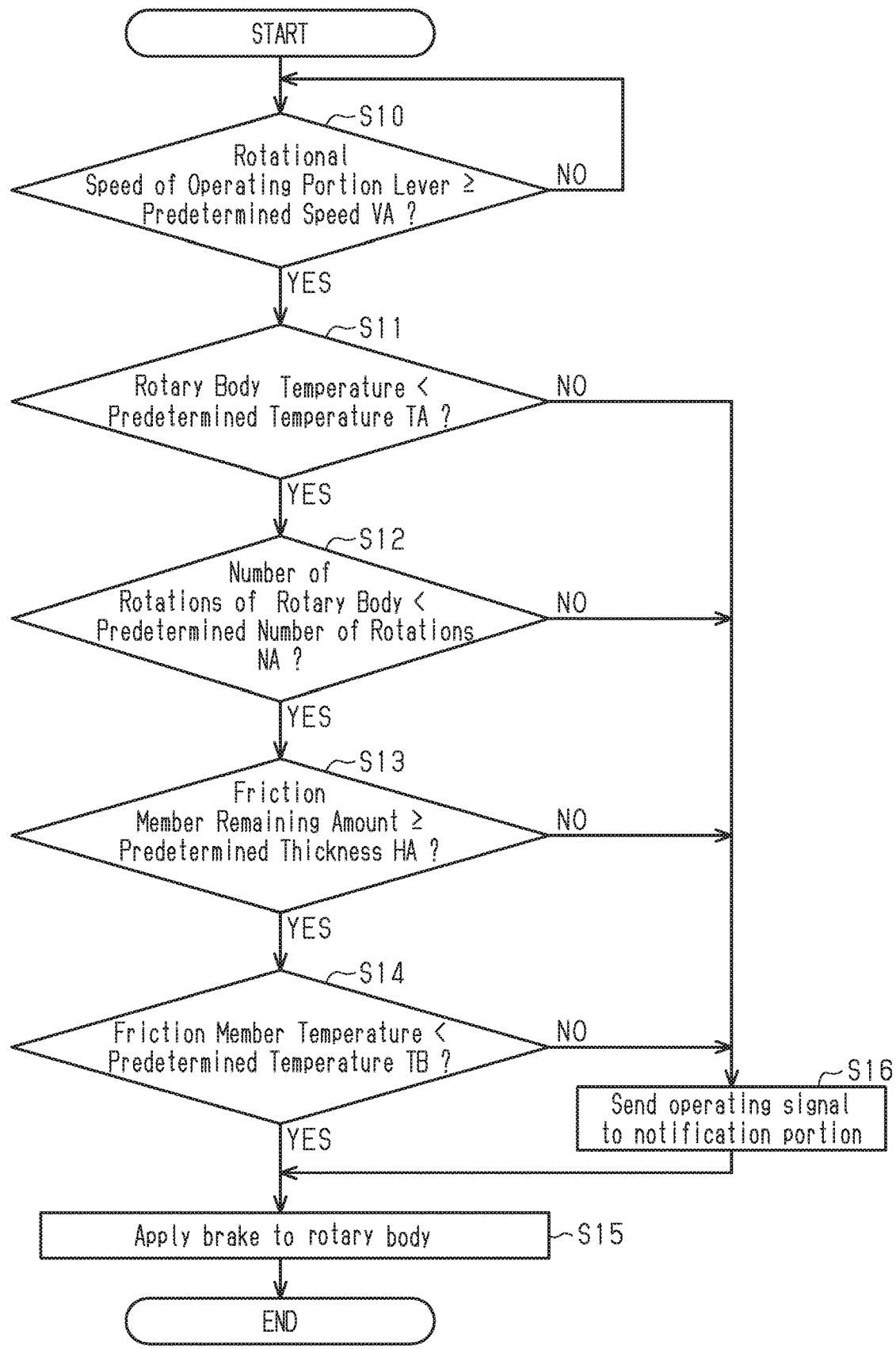
FIG. 4 is a flowchart showing one example of an operation executed by an electronic controller of the brake system shown in FIGS. 1 and 2.

One example of an operation of the brake system 10 will now be described with reference to FIG. 4.

In step S10, the controller 36 determines whether or not the rotational speed of the lever of the operating portion 28 is greater than or equal to a predetermined speed VA based on the second information from the second acquisition portion 34B. The predetermined speed VA is a rotational speed of the lever of the operating portion 28 that determines that the operating portion 28 is operated. If the rotational speed of the lever of the operating portion 28 is greater than or equal to the predetermined speed VA (affirmative determination is made) in step S10, then the controller 36 executes the process of step S11. If a negative determination is made in step S10, then the process waits until the affirmative determination is made. More specifically, in step S10, if an operation of the lever of the operating portion 28 is not detected, then the process waits until the lever of the operating portion 28 is operated.

In step S11, the controller 36 determines whether or not the temperature of the rotary bodies 12 is lower than a predetermined temperature TA based on the first information from the first acquisition portion 34A. The predetermined temperature TA is an assumed upper limit temperature of the rotary bodies 12 in a normal use state. If the temperature of the rotary bodies 12 is lower than the predetermined temperature TA (affirmative determination is made) in step S11, then the controller 36 executes the process of step S12.

In step S12, the controller 36 determines whether or not the number of rotations of the rotary bodies 12 is less than a predetermined number of rotations NA based on the first information from the first acquisition portion 34A. The predetermined number of rotations NA is an assumed upper limit number of rotations of the rotary bodies 12 in a normal use state. If the number of rotations of the rotary bodies 12 is less than the predetermined number of rotations NA (affirmative determination is made) in step S12, then the controller 36 executes the process of step S13.

In step S13, the controller 36 determines whether or not the remaining amount of the friction members 30 is greater than or equal to a predetermined thickness HA based on the second information from the second acquisition portion 34B. The predetermined thickness HA is an assumed lower limit thickness of the friction members 30 in a normal use state. If the thickness of the first friction member 30A and the second friction member 30B is greater than or equal to the predetermined thickness HA (affirmative determination is made) in step S13, then the controller 36 executes the process of step S14.

In step S14, the controller 36 determines whether or not the temperature of the friction members 30 is lower than a predetermined temperature TB based on the second information from the second acquisition portion 34B. The predetermined temperature TB is an assumed upper limit temperature of the friction members 30 in a normal use state. If the temperature of the first friction member 30A and the second friction member 30B is lower than the predetermined temperature TB (affirmative determination is made) in step S14, then the controller 36 executes the process of step S15.

In step S15, the controller 36 drives the electric drivers 26 so that the braking portions 24 brake the rotary bodies 12. The controller 36 drives the electric drivers 26 so that, for example, the rotational speed of the rotary bodies 12 is reduced in a stepped manner.

If the temperature of the rotary bodies 12 is higher than or equal to the predetermined temperature TA in step S11, the number of rotations of the rotary bodies 12 is greater than or equal to the predetermined number of rotations NA in step S12, the thickness of at least one of the first friction member 30A and the second friction member 30B is less than the predetermined thickness HA in step S13, or the temperature of at least one of the first friction member 30A and the second friction member 30B is higher than or equal to the predetermined temperature TB in step S14 (negative determination is made in any one of steps S11 to S14), then the controller 36 executes the process of step S16.

In step S16, the controller 36 sends an operating signal to the notification portion 38. The notification portion 38 notifies the user of the state of the operation of the brake system 10 in accordance with reception of the operating signal. The controller 36 sends different operating signals to the notification portion 38 in accordance with combinations of the negative determination results in steps S11 to S14. The notification portion 38 notifies the user of the negative determinations in notification modes that differ from each other in correspondence with the different operating signals. Alternatively, the controller 36 can be configured to send only one operating signal to the notification portion 38 regardless of combinations of the negative determination results in steps S11 to S14. The controller 36 executes the process of step S15 after step S16.

Programs that implement such an operation of the brake system 10 are stored in the storage of the controller 36. In the controller 36, the processor deploys and executes the programs in the storage to implement such an operation.

Figure 5:
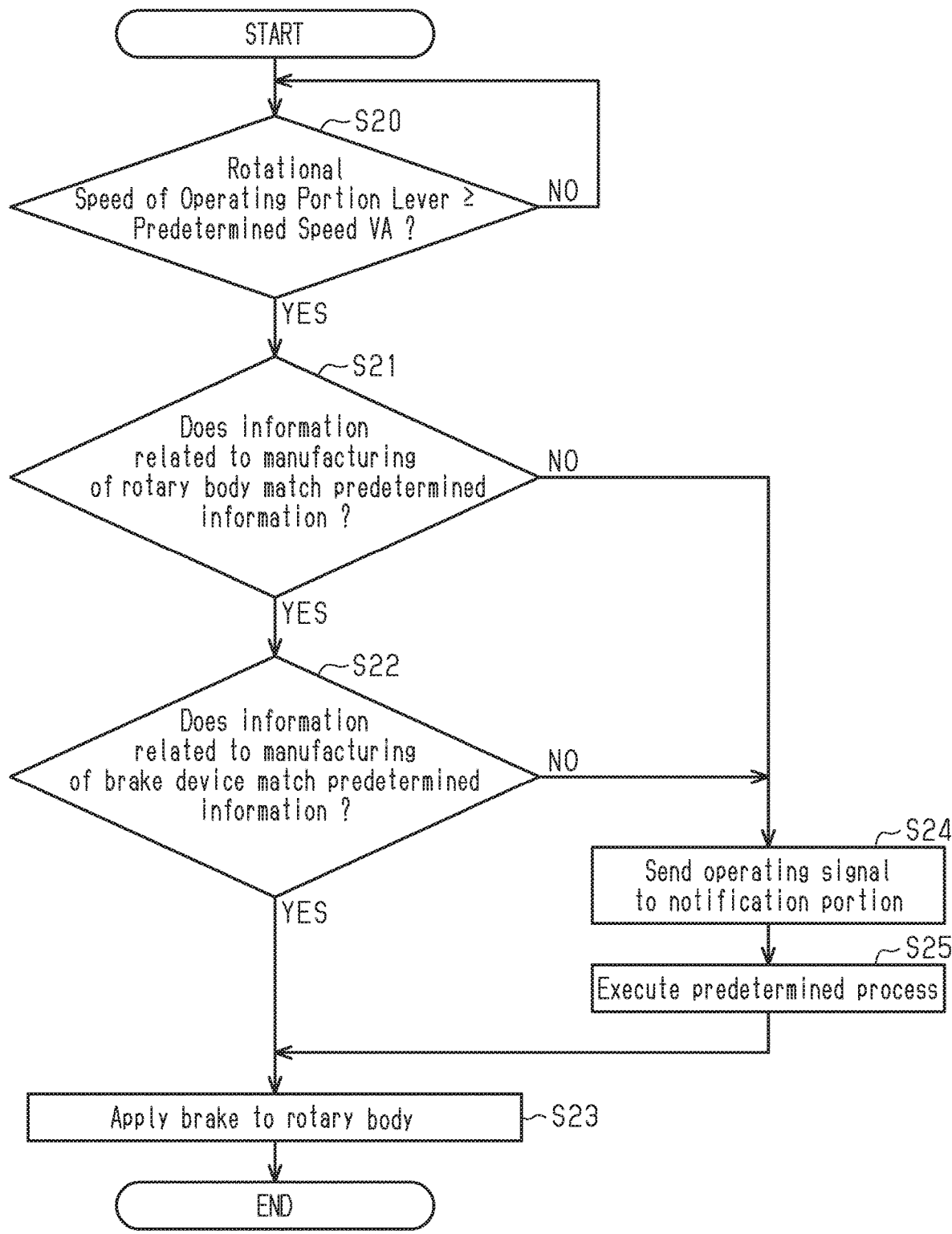
FIG. 5 is a flowchart showing another example of an operation executed by the electronic controller of the brake system shown in FIGS. 1 and 2.

Another example of an operation of the brake system 10 will now be described with reference to FIG. 5.

In step S20, the controller 36 determines whether or not the rotational speed of the lever of the operating portion 28 is higher than or equal to the predetermined speed VA based on the second information from the second acquisition portion 34B. If the rotational speed of the lever of the operating portion 28 is higher than or equal to the predetermined speed VA (affirmative determination is made) in step S20, the controller 36 executes the process of step S21. If a negative determination is made in step S20, then the process waits until the affirmative determination is made. More specifically, if the operation of the lever of the operating portion 28 is not detected in step S20, then the process waits until the lever of the operating portion 28 is operated.

In step S21, the controller 36 determines whether or not the information related to manufacturing of the rotary bodies 12 matches predetermined information based on the first information. The predetermined information includes, for example, the specified manufacturer name of the rotary bodies 12. If the manufacturer name of the rotary bodies 12 that is included in the first information matches the specified manufacturer name included in the predetermined information, then the controller 36 executes the process of step S22.

In step S22, the controller 36 determines whether or not the information related to manufacturing of the brake devices 14 matches predetermined information based on the second information. The predetermined information includes, for example, the specified manufacturer name of each component of the brake devices 14. If the manufacturer name of each component of the brake devices 14 that is included in the second information matches the specified manufacturer name included in the predetermined information, then the controller 36 executes the process of step S23.

In step S23, the controller 36 drives the electric drivers 26 so that the braking portions 24 brake the rotary bodies 12. The controller 36 drives the electric drivers 26 so that, for example, the rotational speed of the rotary bodies 12 is reduced in a stepped manner.

If the manufacturer name of the rotary bodies 12 that is included in the first information does not match the specified manufacturer name included in the predetermined information (negative determination is made) in step S21 or the manufacturer name of each component of the brake devices 14 that is included in the second information does not match the specified manufacturer name included in the predetermined information (negative determination is made) in step S22, then the controller 36 executes the process of step S24.

In step S24, the controller 36 sends an operating signal to the notification portion 38. The notification portion 38 notifies the user of the state of the brake system 10 in accordance with reception of the operating signal. The controller 36 sends different operating signals to the notification portion 38 in accordance with combinations of the negative determination results of steps S21 and S22. The notification portion 38 notifies the user of the negative determinations in notification modes that differ from each other in correspondence with the different operating signals. Alternatively, the controller 36 can send only one operating signal to the notification portion 38 regardless of combinations of the negative determination results in steps S21 and S22. The controller 36 executes the process of step S25 after step S24. In step S25, the controller 36 executes a predetermined process. The predetermined process is, for example, a setting process that maintains brakes applied to the rotary bodies 12 by the braking portions 24 after step S23.

Programs that implement such an operation of the brake system 10 are stored in the storage of the controller 36. In the controller 36, the processor deploys and executes the programs in the storage to implement such an operation.

The brake system 10 has the operation and advantages as follows. The brake devices 14 are driven based on information acquired by the acquisition portion 34. Thus, the brake devices 14 appropriately brake the rotary bodies 12.

Modifications

The above embodiment exemplifies, without any intention to limit, applicable forms of a control device and a brake system according to the present invention. The control device and the brake system according to the present invention can have applicable forms differing from the forms described in the embodiment. For example, part of the configuration of the embodiment is replaced, modified, or omitted, or an additional configuration is added to the embodiment. Modifications of the embodiment are, for example, as follows.

Figure 6:
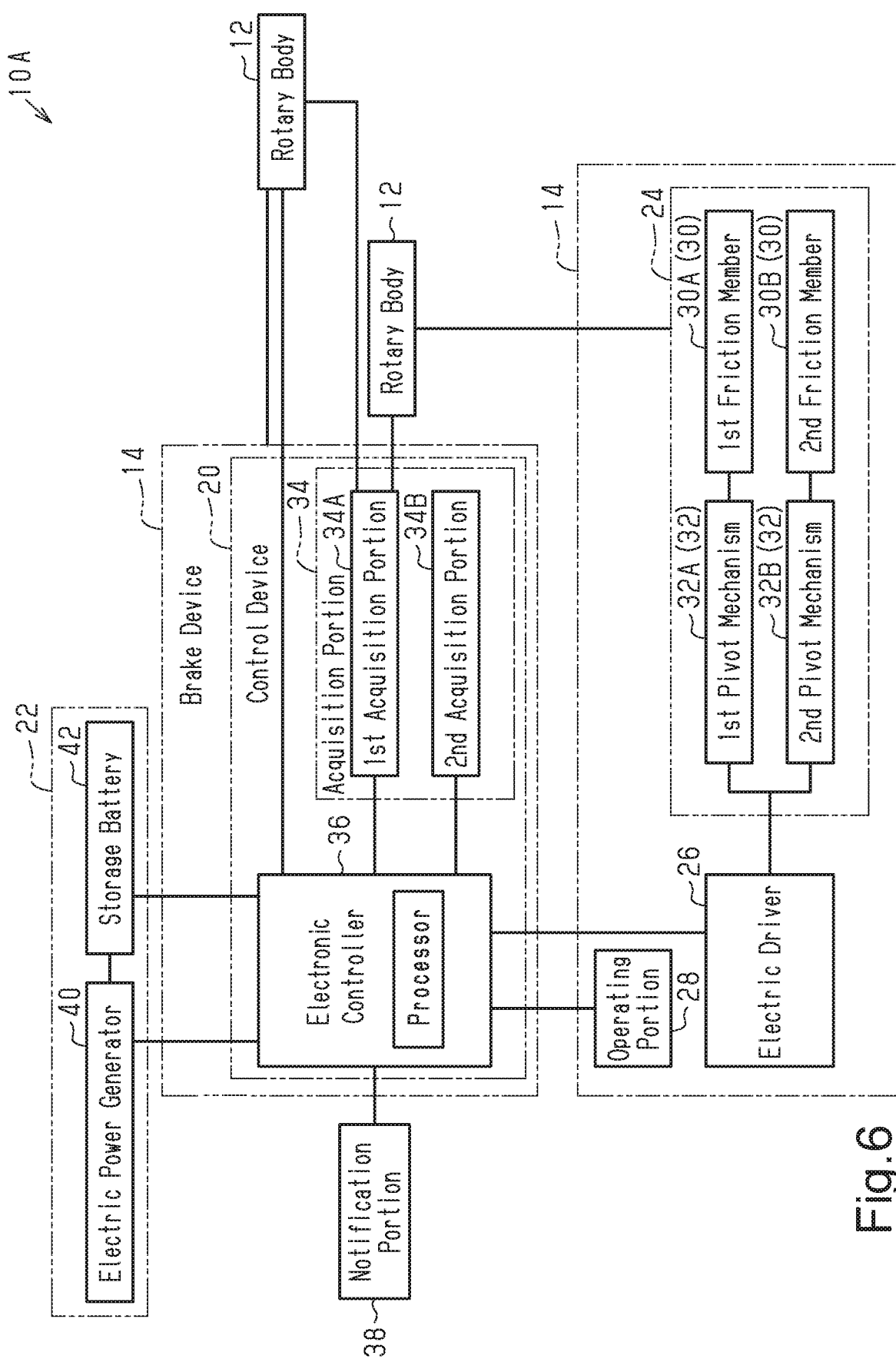
FIG. 6 is a block diagram of a modified brake system for the human-powered vehicle shown in FIG. 1.

The configuration of the brake devices 14 and the control device 20 can be changed in any manner. For example, as seen in FIG. 6, a modified brake system 10A is illustrated in which the brake system 10A has been modified by rearranging selected parts. For the sake of consistency, the same parts of the brake system 10A will be given the same references numerals as the same parts of the brake system 10. The modified brake system 10A is the same as the brake system 10A, except as described below. Here, the modified brake system 10A comprises the rotary bodies 12, the brake devices 14, and the control device 20, which are discussed above. As seen in FIG. 6, the control device 20 is provided at one of the brake devices 14. A modification of the brake device 14 comprises a first braking portion braking the rotary body 12 provided at the front wheel A3 and a second braking portion provided at the rear wheel A4. A control device of this modification comprises a first control device controlling a first electric driver of the first braking portion and a second control device controlling a second electric driver of the second braking portion. The first control device is provided at the first braking portion. The first control device controls the first electric driver based on at least one of the first information and the second information. The second control device is provided at the second braking portion. The second control device controls the second electric driver based on at least one of the first information and the second information. The first control device and the second control device are configured to perform wired or wireless communication with each other. The one or the other of the two brake devices 14 can be omitted from the brake system 10. The braking portions 24 of the two brake devices 14 can be driven by one electric driver 26.

What is claimed is:

1. A control device of a brake system of a human-powered vehicle, wherein the brake system includes a rotary body and a brake device braking the rotary body, the control device comprising:
   an acquisition portion that acquires information related to at least one of the rotary body and the brake device, the acquisition portion including at least one sensor and a communicator configured to communicate with an external user terminal, the external user terminal being configured to accept information that is input by a user regarding at least one of the rotary body and the brake device; and
   an electronic controller configured to control the brake device based on the information acquired by the acquisition portion.

2. The control device according to claim 1, wherein the acquisition portion is configured to acquire first information related to the rotary body.

3. The control device according to claim 2, wherein the at least one sensor is a temperature sensor configured to acquire information related to a temperature of the rotary body as the first information.

4. The control device according to claim 2, wherein the at least one sensor is a rotation sensor configured to acquire information related to a number of rotations of the rotary body as the first information.

5. The control device according to claim 2, wherein the communicator is configured to acquire information related to manufacturing of the rotary body as the first information.

6. The control device according to claim 1, wherein the acquisition portion is configured to acquire second information related to the brake device.

7. The control device according to claim 6, wherein the at least one sensor is configured to acquire information related to a friction member contacting the rotary body as the second information.

8. The control device according to claim 7, wherein the at least one sensor includes a thickness sensor that is configured to acquire information related to a remaining amount of the friction member as the second information.

9. The control device according to claim 7, wherein the at least one sensor includes a temperature sensor that is configured to acquire information related to a temperature of the friction member as the second information.

10. The control device according to claim 6, wherein at least one of the at least one sensor and the communicator is configured to acquire information related to an operating portion operated by the user as the second information.

11. The control device according to claim 10, wherein at least one of the at least one sensor and the communicator is configured to acquire information related to input and output of the operating portion as the second information.

12. The control device according to claim 6, wherein the communicator is configured to acquire information related to manufacturing of the brake device as the second information.

13. The control device according to claim 1, further comprising the electronic controller operatively connected to the brake device which includes a braking portion that is configured to apply a braking force to the rotary body and an electric driver that is configured to drive the braking portion in response to an output signal from the electronic controller.

14. The control device according to claim 13, wherein the acquisition portion is operatively connected to the electronic controller to communicate with the electronic controller, and the electronic controller is configured to control the electric driver based on information from the acquisition portion.

15. The control device according to claim 1, further comprising a notification portion that is operatively connected to the acquisition portion and that is configured to be activated based on information from the acquisition portion.

16. A brake system comprising:
a rotary body;
a brake device braking the rotary body; and
a control device, the control device comprising:
an acquisition portion that acquires information related to at least one of the rotary body and the brake device, the acquisition portion including at least one sensor and a communicator configured to communicate with an external user terminal, the external user terminal being configured to accept information that is input by a user regarding at least one of the rotary body and the brake device; and
an electronic controller configured to control the brake device based on the information acquired by the acquisition portion.

17. The brake system according to claim 16, wherein the control device is provided at the brake device.

18. The brake system according to claim 16, further comprising the rotary body.

19. The brake system according to claim 16, further comprising a power supply electrically connected to the brake device.

20. The brake system according to claim 19, wherein the power supply includes an electric power generator.

21. The brake system according to claim 19, wherein the power supply includes a storage battery.

* * * * *